(12) United States Patent
Cassorla

(10) Patent No.: US 7,694,309 B2
(45) Date of Patent: Apr. 6, 2010

(54) METHOD FOR FACILITATING UNIFICATION OF EVENT FRAMEWORK VIEWS AND SYSTEM COMPRISING SAME

(75) Inventor: Jonathan Cassorla, Austin, TX (US)

(73) Assignee: Newisys, Inc., Austin, TX (US)

( * ) Notice: Subject to any disclaimer, the term of this patent is extended or adjusted under 35 U.S.C. 154(b) by 1088 days.

(21) Appl. No.: 11/353,399

(22) Filed: Feb. 14, 2006

(65) Prior Publication Data

US 2007/0192770 A1 Aug. 16, 2007

(51) Int. Cl.
*G06F 13/00* (2006.01)
(52) U.S. Cl. .................... 719/318; 719/316; 707/100; 707/103 R
(58) Field of Classification Search ............... 719/318, 719/316; 707/100, 103 R
See application file for complete search history.

(56) References Cited

U.S. PATENT DOCUMENTS

| | | | | |
|---|---|---|---|---|
| 7,584,222 B1* | 9/2009 | Georgiev | ................... | 707/201 |
| 2003/0074446 A1* | 4/2003 | Musante et al. | ............. | 709/224 |
| 2005/0251540 A1* | 11/2005 | Sim-Tang | ................... | 707/202 |

\* cited by examiner

*Primary Examiner*—Andy Ho
(74) *Attorney, Agent, or Firm*—Raymond M. Galasso; Galasso + Associates, L.P.

(57) ABSTRACT

An object model comprises a data store and a plurality of event framework information objects. The data store including a plurality of event information objects each defining server event information for a respective one of a plurality of unique events exhibited by a server during operation. The plurality of event framework information objects each define event framework characteristics for a respective one of a plurality of event frameworks implemented in the server. At least one of the event framework information objects reference a common one of the event information objects for enabling server event information defined by the common one of the event information objects to be viewed using the respective one of the event frameworks corresponding thereto. Each one of the event framework information objects define event framework unification rules under which unification of event framework views provided in accordance with each one of the event framework information objects is facilitated.

19 Claims, 8 Drawing Sheets

METHOD FOR FACILITATING UNIFICATION OF EVENT FRAMEWORK VIEWS AND SYSTEM COMPRISING SAME

FIELD OF THE DISCLOSURE

The disclosures made herein relate generally to event data store functionality in a server and, more particularly, to enabling event data store information to be accessed, viewed and managed (e.g., deleted) in a consistent, unified and methodical manner by a plurality of different event management frameworks within a server.

BACKGROUND

System events are instances of indications in a system that something has gone wrong, is about to go wrong, or simply a notification of an interesting event in the system. Event instances may be solicited (e.g., requested) or unsolicited (e.g., pre-configured). There are a variety of management systems that deal with system events in very different ways. Some simply log them to a file in order to preserve an archive. Others keep accurate and up to date records that help administrators identify problems related to the system with a single glance by viewing historical information.

In a conventional approach to managing system events, an administrator of a system often goes through multiple event frameworks/views in order to witness and analyze the state of the system or history of events that may have occurred. Events are defined herein to include alerts. Due to the configuration of conventional event management frameworks, the administrator (often unknowingly) utilizes multiple event frameworks/views in order to witness such state of the system or history of events. The reason for this situation of going through multiple event frameworks/views is that each of these event frameworks typically has its own data store that is managed independently. Undesirably, these multiple event data stores increase the required storage (e.g., at least one per framework) and complexity of an entire software stack of the system. Furthermore, conventional event management frameworks implement a method of managing event data stores that require the respective event management frameworks itself to copy and/or store event information into a respective event data store (i.e., a private event data store), which is inefficient from a resource utilization standpoint and system efficiency standpoint.

System event indications are delivered by any number of event indication output means. Examples of such event indication output means include, but are not limited to, event log entries, web console queries, command line event queries, operating panel fault indicators, Simple Network management Protocol (SNMP) traps, Intelligent Platform Management Interface (IPMI) System Event Log (SEL) entries, IPMI Platform Event Trap (PET) and Simple Main Transfer Protocol (SMTP) email. Delivery via such event indication output means may be performed in any automatic (i.e., pre-configured) manner or upon request.

The various event indication output means implemented in conventional event management frameworks lead to a number of drawbacks with respect to management of system event data. One drawback is that inter-framework communication is limited such that not all system event data is accessible through each interface. Another drawback is that each interface typically has its own data store that is managed separately. Because there are separately managed data stores, the views of these data stores will be disparate and the management of these stores will be disparate. Still another drawback is that this disparate and non-integrated management of data store information limits, if not precludes, efficient and effective unification of event framework views.

Therefore, implementation of event management frameworks and event data stores in a manner that overcomes drawbacks associated with conventional approaches for implementing event management frameworks and event data stores would be useful and advantageous.

SUMMARY OF THE DISCLOSURE

Embodiments of the present invention provide various event management frameworks with the impression that their respective events (i.e., system events) are housed in a private data store and that the event management frameworks are managing the lifetime of the respective events within that private data store. However, unlike conventional approaches for enabling event management frameworks to access events in a private data store, embodiments of the present invention do so without undue complexity or overhead of the actual management by the event management frameworks. More specifically, embodiments of the present invention provide a shared event data store for logically exclusive use by all event frameworks and provide interfaces for objects that contain event information (i.e., BasicEvent objects). These interfaces allow event frameworks to store their own private data within the BasicEvent objects for representing event data in a private format and to maintain references to the BasicEvent objects such that any event framework can affect the lifetime of such BasicEvent objects. Implementation of a shared event data store and unified event framework views in accordance with the present invention is enabled by a software architecture that provides for forwarding of the notification of all created and all deleted events through a generic distribution system (i.e., an EventDirector object). Accordingly, the present invention advantageously overcomes one or more shortcomings associated with conventional approaches for implementing event management frameworks and event data stores in a computer system such as a server.

It is an object of the present invention to provide a methodology for cross event framework interactions through the use of side effects that allow users to view the events within a system in a consistent fashion, regardless of the framework view being utilized by a particular management application. In doing so, the present invention provides for unification of event framework views thereby enabling a system administrator to utilize a variety of different event management applications without sacrificing a common event subsystem view. Advantageously, such unification serves to effectively disengage events in the system from management views through which they are observed such that a plurality of different utilized industry tools have unified and consistent views of events within the system, regardless of the event framework that they utilize for such observation. A benefit of such functionality is that new event framework models may be implemented more quickly, effectively and efficiently, thereby providing for a quicker time to market for such new event framework models and the ability to enable common views within new framework models.

In one embodiment of the present invention, an object model comprises a data store and a plurality of event framework information objects. The data store includes a plurality of event information objects each defining server event information for a respective one of a plurality of unique events exhibited by a server during operation. The plurality of event framework information objects each define event framework characteristics for a respective one of a plurality of event frameworks implemented in the server. At least one of the event framework information objects reference a common one of the event information objects for enabling server event information defined by the common one of the event information objects to be viewed using the respective one of the event frameworks corresponding thereto. Each one of the event framework information objects define event framework unification rules under which unification of event framework views provided in accordance with each one of the event framework information objects is facilitated.

In another embodiment of the present invention, a method of facilitating unification of event framework views comprises a plurality of operations. An operation is performed for creating an event information object defining server event information for a respective one of a plurality of unique events exhibited by the server during operation. An operation is performed for creating a reference to the event information object by each one of a plurality of event framework information objects. Each one of the event framework information objects define respective event framework unification rules under which unification of event framework views provided in accordance with each one of the event framework information objects is facilitated. An operation is performed for implementing an action affecting a first one of the event framework information objects dependent upon event framework unification rules defined by the first one of the event framework information objects. An operation is performed for notifying a second one of the event framework information objects of the action affecting the first one of the event framework information objects. An operation is performed for assessing event framework unification rules defined by the second one of the event framework information objects for determining an action to be taken with respect to the second one of the event framework information objects.

In another embodiment of the present invention, a server comprises at least one data processing device, memory coupled to the at least one data processing device, and instructions accessible from the memory and processable by the at least one data processing device. The instructions are configured for enabling the at least one data processing device to facilitate a plurality of operations. On operation involves creating an event information object defining server event information for a respective one of a plurality of unique events exhibited by the server during operation. Another operation involves creating a reference to the event information object by each one of a plurality of event framework information objects. Each one of the event framework information objects define respective event framework unification rules under which unification of event framework views provided in accordance with each one of the event framework information objects is facilitated. Another operation involves implementing an action affecting a first one of the event framework information objects dependent upon event framework unification rules defined by the first one of the event framework information objects. Another operation involves notifying a second one of the event framework information objects of the action affecting the first one of the event framework information objects. Another operation involves assessing event framework unification rules defined by the second one of the event framework information objects for determining an action to be taken with respect to the second one of the event framework information objects.

Turning now to specific aspects of the present invention, in at least one embodiment, the event framework unification rules of a respective one of the event framework information objects include rules that are non-specific to the respective one of the event framework information objects and rules that are specific to the respective one of the event framework information objects.

In at least one embodiment of the present invention, the rules that are non-specific to the respective one of the event framework information objects include a rule that management through a particular protocol must not cause side effects from the protocol perspective, a rule that an aggregate framework event representation must be deleted in a single action and a rule that removal of a reference to a particular one of the event information objects by one of the event frameworks requires all other ones of the event frameworks to be notified of such removal.

In at least one embodiment of the present invention, the rules that are specific to a first one of the event framework information objects, which represents an aggregation-type event framework, include a rule that a unique system event may be deleted at any time, a rule that non-unique system events can be deleted when the composite severity of the non-unique system events is informational (or nominal) and a rule that all instances of a composite system event representation by the first one of the event framework information objects will be deleted in response to the reference to the most recent one of the event information objects being removed unless such action would violate another one of the rules that are specific to the first one of the event frameworks.

In at least one embodiment of the present invention, the rules that are specific to a second one of the event framework information objects, which represents a singleton-type event framework, include a rule that any system event can be deleted at any time, a rule that each system event representation by the second one of the event frameworks has a 1:1 relationship with a respective one of the event information objects and a rule that a system event representation by the second one of the event frameworks is deleted when the corresponding one of the event information objects is deleted.

In at least one embodiment of the present invention, implementing the action affecting the second one of the event framework information objects after performing the determining action to be taken with respect to the second one of the event framework information objects and confirming that the action to be taken with respect to the second one of the event framework information objects does not violate any of the event framework unification rules defined by the second one of the event framework information objects.

In at least one embodiment of the present invention, an operation is performed for deleting the event information object after performing the assessing event framework unification rules defined by the second one of the event framework information objects.

In at least one embodiment of the present invention, the action affecting the first one of the event framework information objects includes deleting the reference of the first one of the event framework information objects to the event information object and the action affecting the second one of the event framework information objects includes deleting the reference of the second one of the event framework information objects to the event information object.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
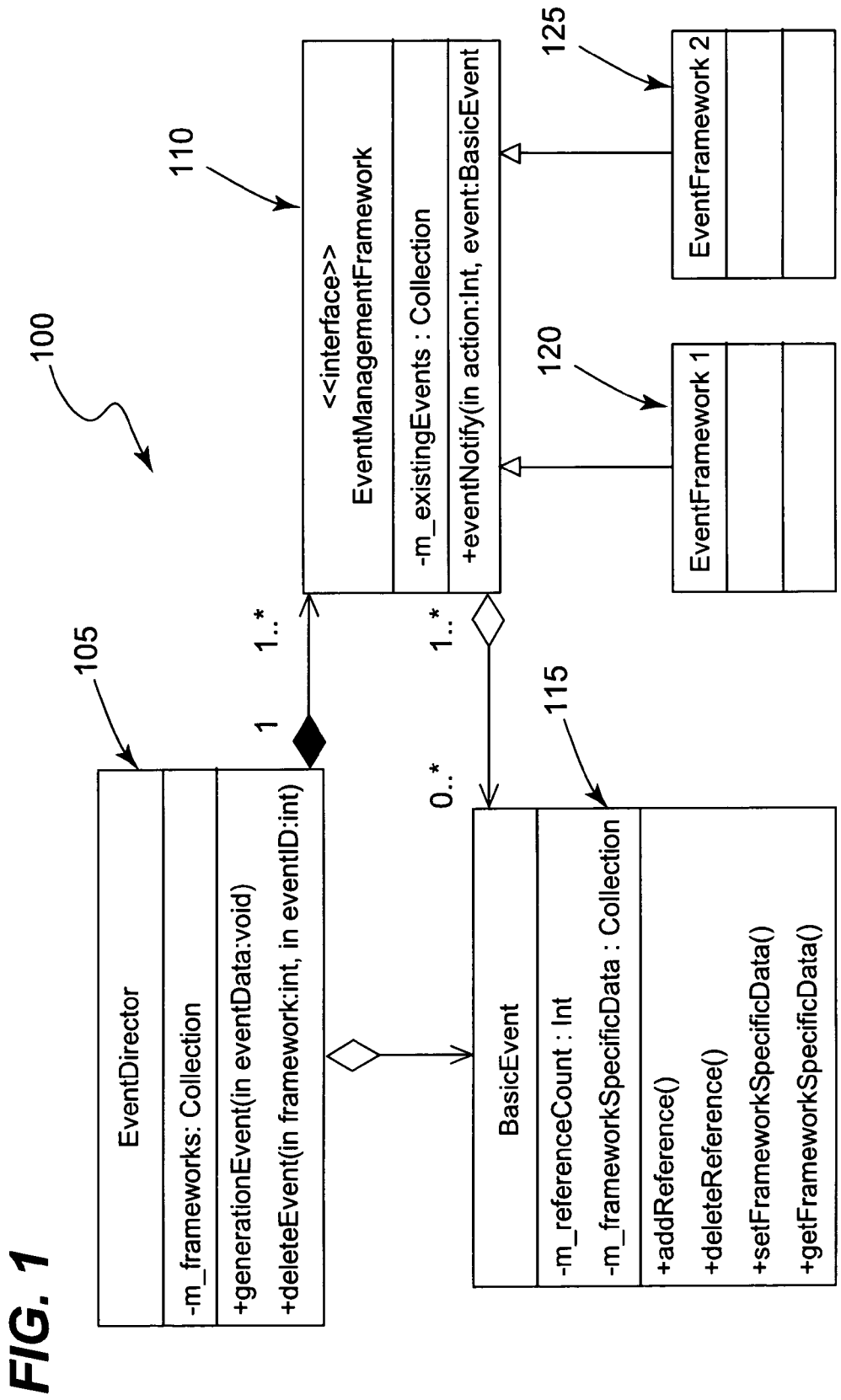
FIG. 1 is a class hierarchy diagram depicting object model architecture representing for an embodiment of a shared event data store platform in accordance with the present invention

FIG. 1 is a class hierarchy diagram depicting object model architecture representing for an embodiment of a shared event data store platform in accordance with the present invention, which is referred to herein as the shared event data store platform 100. The shared event data store platform 100 includes an EventDirector object 105, a plurality of EventManagementFramework objects 110, a plurality of BasicEvent objects 115, a first event framework 120 and a second event framework 125. The EventDirector object 105, each EventManagementFramework object 110 and each BasicEvent object 115 are created in the image of, respectively, an EventDirector object class, an EventManagementFramework object class and a BasicEvent object class.

It should be understood that usefulness of the present invention is not limited by a particular number of event frameworks. In the depicted embodiment of the shared event data store platform 100, two event frameworks (i.e., the event frameworks (120, 125)) are included. In other embodiment (not shown), a shared event data store platform in accordance with the present invention may include more than two event frameworks or less than two event frameworks.

The first event framework 120 and the second event framework 125 are illustrative examples of event frameworks implemented in service processor embedded within a server of a data processing system. As is discussed below in greater detail, the EventDirector object 105, the EventManagementFramework objects 110 and the BasicEvent objects 115 interact to provide the first event framework 120 and the second event framework 125 with the impression that their respective events are housed in private (e.g., separate) data store and that they are individually managing the lifetime of the event within their respective private data store. Advantageously, the shared event data store platform 100 provides such functionality with reduced complexity and overhead with respect to conventional approaches for implementing event management frameworks as it makes the data store management as simple as managing a reference to an object.

The EventDirector object 105 is an agnostic object model component that, in effect, is the entry point to the shared event data store platform 100 for information from event generators and other system components. The EventDirector object 105 provides functionality that includes receiving information from event generators (e.g., new events, deleted events, etc), understanding which event management frameworks are configured for interaction with the shared event data store platform 100, acting as the proxy agent for notifying all such configured frameworks of the creation and deletion of events, and managing a shared event data store consisting of the plurality of BasicEvent objects 115 that exclusively serves all of the configured frameworks. More specifically, a shared event data store in accordance with the present invention includes a plurality of BasicEvent objects 115 each defining server event information for a respective one of a plurality of unique events (e.g., events occurring at different times, events having different parameters, etc) and event information is provided to each one of the EventManagementFramework objects 110 exclusively from the shared event data store. This shared event data store is advantageous in that it is an underlying aspect of the shared event data store platform 100 that enables event data to be exclusively provided to each one of the event frameworks (120, 125) in a manner as if shared event data store were the event framework's own private and/or custom-configured data store.

The EventDirector object 105, which is an embodiment of an event managing object in accordance with the present invention, is the object that all event generators in a system ultimately interact with in order to propagate events to all configured event management frameworks. With respect to managing the contents of the shared event data store, the EventDirector object 105 has a number of responsibilities once it has been notified of a new event by an event generator. One responsibility is to create an instance of an object instantiated from the BasicEvent object class (i.e., a new BasicEvent object) that represents the event data and notifying each of the EventManagementFramework objects 110 of existence of this new BasicEvent object. Another responsibility is to manage the persistence of the BasicEvent objects that make up the shared event data store.

Each one of the EventManagementFramework objects 110 is a generalized object that defines specific characteristics of a respective event framework—in essence, what the respective event framework looks like. Each one of the EventManagementFramework objects 110 are an embodiment of an event framework information object in accordance with the present invention. The event frameworks (120, 125) each maintain a respective collection of events, references to all or a portion of the BasicEvent objects 115 and how the BasicEvent objects 115 each map to specific events accessible via the event framework (120, 125). In response to actions forwarded to a particular one of the EventManagementFramework objects 110 by the EventDirector object 105, a derivation of that particular one of the EventManagementFramework objects 110 will interact with its respective event subsystem and take appropriate action, such as generating asynchronous indications, creating event log entries, or removing them. Accordingly, the EventManagementFramework objects 110 each have a number of related responsibilities. One responsibility is providing an interface enabling access to specifics of an event management subsystem represented by a corresponding one of the EventManagementFramework objects 110 to be accessed. Another responsibility is creating and removing references to appropriate ones of the BasicEvent objects 115 that each one of the EventManagementFramework objects 110 has a need or desire to represent within the respective one of the event frameworks (120, 125). In doing so, a particular one of the BasicEvent objects 115 may be deleted once none of the configured frameworks (i.e., the first and second frameworks (120, 125)) make reference to that particular one of the BasicEvent objects 115. Still another responsibility is storing all appropriate framework specific information within referenced ones of the BasicEvent objects 115 so that events are able to be presented and/or manipulated by a corresponding one of the event frameworks (120, 125) in accordance with such framework specific information.

Each one of the BasicEvent objects 115 is an embodiment of an event information object in accordance with the present invention and corresponds to a respective event exhibited within the system in which the shared event data store platform 100 is implemented. Examples of such events, include, but are not limited to, exceeding an operating condition, setting an alarm, implementation of a diagnostic activity and the like. Each one of the BasicEvent objects 115 contains all of the information required for enabling interfacing of the shared event data store with an event framework to be carried out by the EventManagementFramework objects 110. Additionally, each one of the BasicEvent objects 115 provides a respective interface that allows the first and second event frameworks (120, 125) to store their own specific data within the BasicEvent objects 115 to which they refer. A BasicEvent has a reference count associated with it, which determines its lifetime. Any event framework wishing to keep track of this event must maintain a reference to the object. Once the reference count reaches zero, the EventDirector destroys the object.

Figure 2:
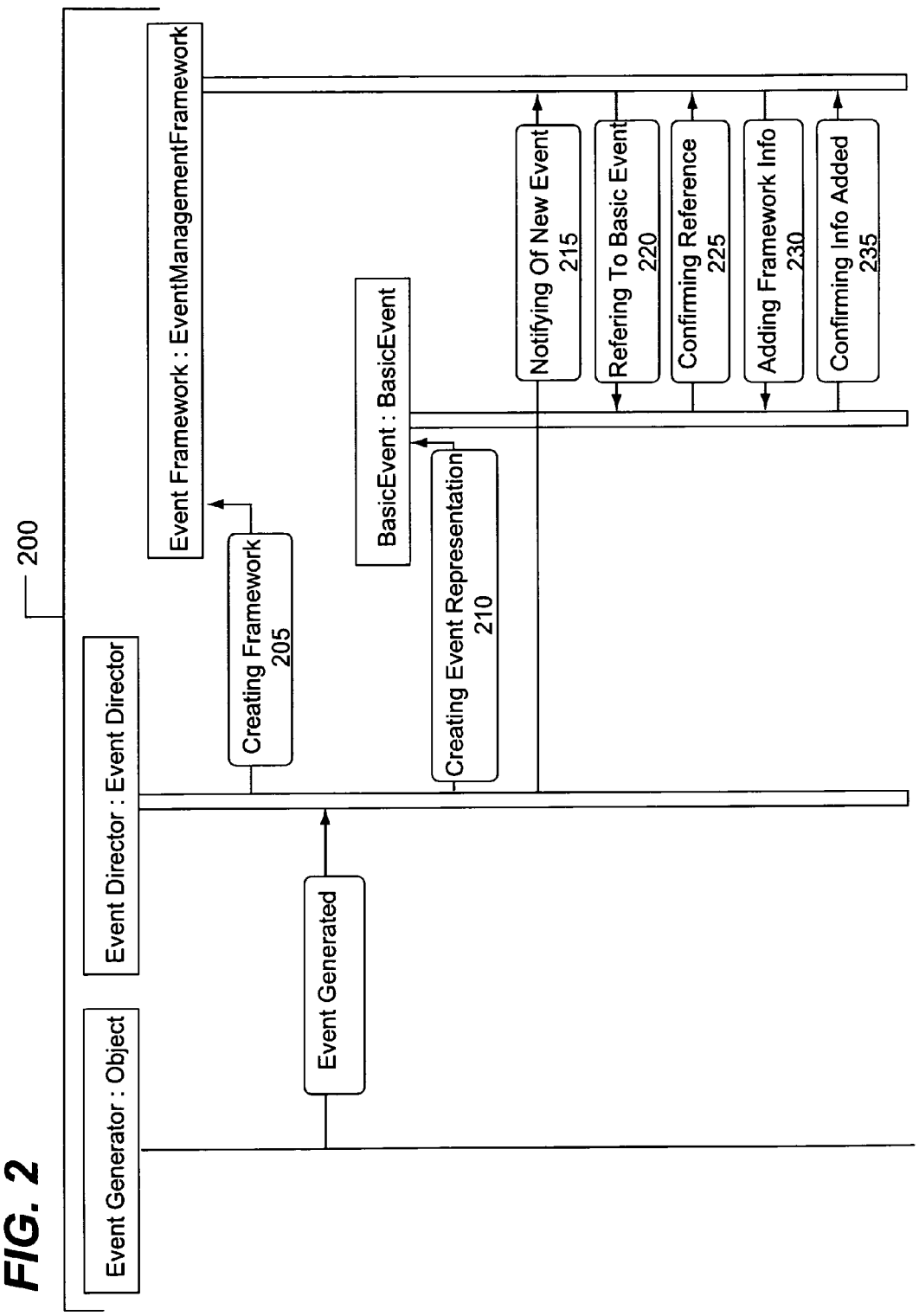
FIG. 2 is a sequence diagram depicting an embodiment of a method for enabling an event framework in a system to access event information from a shared event data store in accordance with the present invention.

FIG. 2 is a sequence diagram depicting an embodiment of a method for enabling an event framework in a system to access event information from a shared event data store in accordance with the present invention. The method depicted in FIG. 2 is referred to herein as the method 200. The object model architecture of the shared event data store platform 100 depicted in FIG. 1 is an example of an object model architecture suitably configured for carrying out the method 200. However, in view of the disclosures made herein, a skilled person will appreciate that enabling an event framework in a system to access event information from an event data store in accordance with the present invention may be implemented using an object model architecture different than the object model for the shared event data store platform 100 depicted in FIG. 1. It will also be appreciated with a plurality of event frameworks may be served by the method 200.

The method 200 begins with an EventDirector object in accordance with the present invention performing an operation 205 for creating an instance of an EventManagementFramework object representing the event framework in the system (i.e., object instruction "constructor"). After creating the instance of the EventManagementFramework object and in response to receiving notification from an event generator that an event has been generated, the EventDirector object performs an operation 210 for creating an instance of a BasicEvent object corresponding to the event (i.e., object instruction "constructor"). Accordingly, the BasicEvent object contains information representing the event. Also after creating the instance of the BasicEvent object, the EventDirector object performs an operation 215 for notifying the EventManagementFramework object of the existence of the new event (i.e., object instruction "eventNotify(EVENT_Generate; BasicEvent&)").

In response to being notified of existence of the new event, the EventManagementFramework object performs an operation 220 for creating a reference to the BasicEvent object (i.e., object instruction "addReference( )"). Preferably, but not necessarily, creating the reference to the BasicEvent object includes causing a reference value of the BasicEvent object to increment by 1. In doing so, the BasicEvent object persists so long as the reference value is at least one. In response to the reference to the BasicEvent object being created, the BasicEvent object performs an operation 225, the BasicEvent performs operation 225 by confirming with the EventManagementFramework object that the reference has been added to the BasicEvent object. Also in response to being notified of existence of the new event, the EventManagementFramework object performs an operation 230 for adding framework specific information to the BasicEvent object (i.e., object instruction "setFrameworkSpecificData( )"). As discussed above, providing framework specific information within the BasicEvent object advantageously allows the event to be presented and/or manipulated by the event framework dependent upon such framework specific information. In response to the framework specific information being added, the BasicEvent object performs an operation 235 for confirming with the EventManagementFramework object that the framework specific information has been added to the BasicEvent object.

Figure 3:
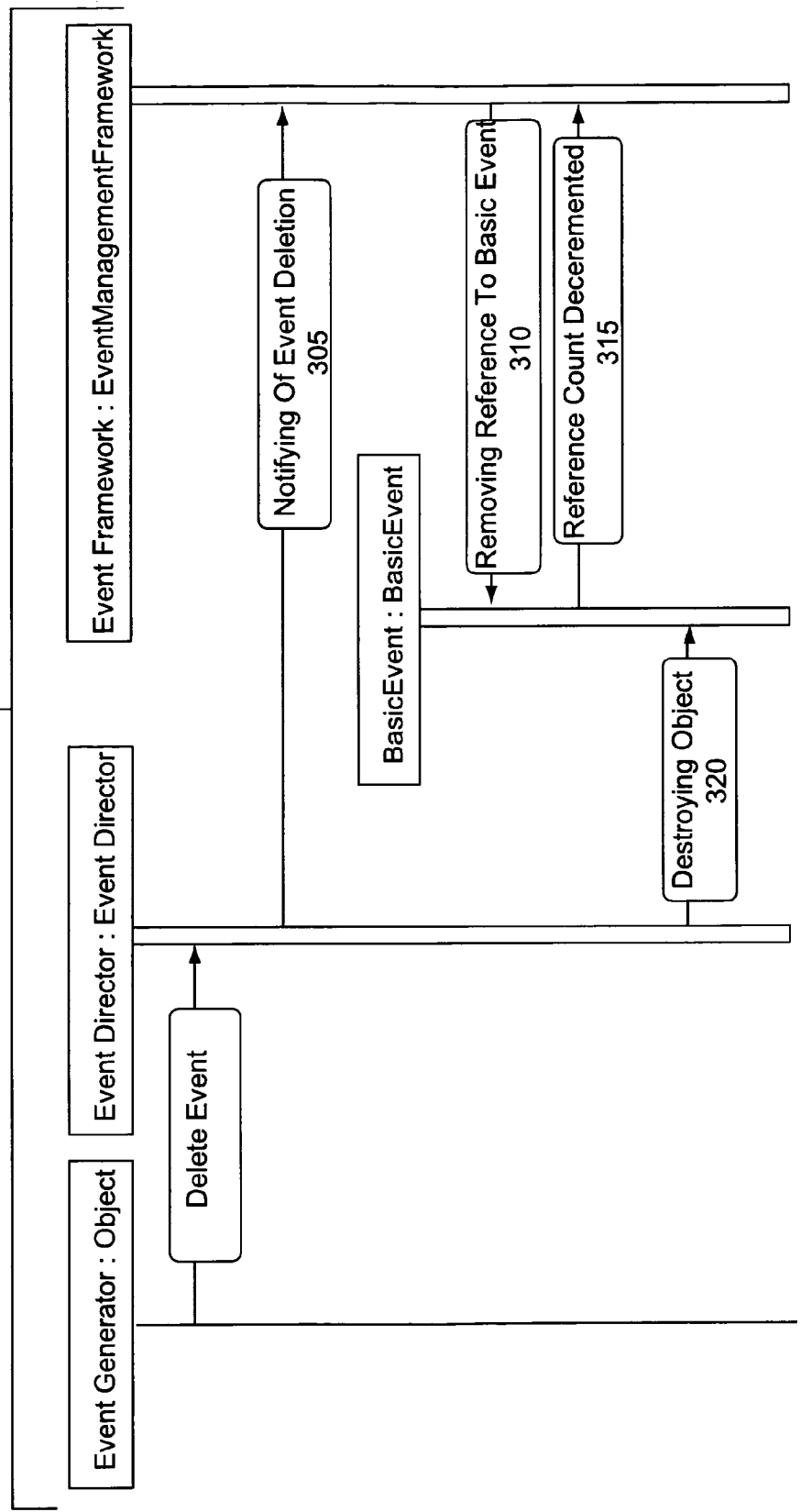
FIG. 3 is a sequence diagram depicting an embodiment of a method for destroying a BasicEvent object in accordance with the present invention.

FIG. 3 is a sequence diagram depicting an embodiment of a method for destroying a BasicEvent object in accordance with the present invention. The method depicted in FIG. 2 is referred to herein as the method 300. The object model architecture of the shared event data store platform 100 depicted in FIG. 1 is an example of an object model architecture suitably configured for carrying out the method 300. However, in view of the disclosures made herein, a skilled person will appreciate that destroying a BasicEvent object in accordance with the present invention may be implemented using an object model architecture different than the object model for the shared event data store platform 100 depicted in FIG. 1. It will also be appreciated with a plurality of event frameworks may be served by the method 300.

The method 300 begins with an EventDirector object in accordance with the present invention performing an operation 305 for notifying the EventManagementFramework object that the event corresponding a BasicEvent object has been deleted (i.e., object instruction "eventNotify(EVENT_Deleted,BasicEvent&)") in response to receiving notification from an event generator (or EventManagementFramework object) that such event has been deleted. In response to the EventManagementFramework object being notified that the event corresponding a BasicEvent object has been deleted, the EventManagementFramework object performs an operation 310 for removing reference of the EventManagementFramework object to the BasicEvent object (i.e., object instruction "deleteReference( )"). Thereafter, the BasicEvent object performs an operation 315 for confirming with the EventManagementFramework object that reference of the EventManagementFramework object to the BasicEvent object has been removed.

Preferably, but not necessarily, removing reference to the BasicEvent object includes causing a reference value of the BasicEvent object to decrement by 1. In doing so, the BasicEvent object persists so long as the reference value is at least one. In the case where decrementing the reference value of the BasicEvent object by 1 causes the reference value of the BasicEvent object to become 0, the Event Director performs an operation 320 for facilitating destruction (i.e., deletion) of the BasicEvent object.

The foregoing discussion discloses an event management distribution architecture that supports unification of event framework views in accordance with the present invention (i.e., event framework unification functionality). Such event framework unification functionality enables a system administrator to utilize a variety of different event management applications without sacrificing a common event subsystem view. It provides a strategy to use within the EventManagementFramework objects for providing a specific affect across the frameworks such that event framework views of all frameworks imparted with such event framework unification functionality exhibit a consistent and unified structure (i.e., consistent and unified representation of system events). Lifetime characteristics of BasicEvent objects as controlled by references to such BasicEvent objects by EventManagementFramework objects, as discussed above in reference to FIGS. 1-3 in greater detail, are the basis by which the EventManagementFrameworks objects facilitate event framework unification functionality. Advantageously, such event framework unification functionality serves to effectively disengage events in the system from management views through which they are observed such that a plurality of different utilized industry tools have unified and consistent views of events within the system, regardless of the event framework that they utilize for such observation. A benefit of such functionality is that new event framework models may be implemented more quickly, effectively and efficiently, thereby providing for a quicker time to market for such new event framework models and the ability to enable common views within new framework models.

As discussed above in reference to FIGS. 1-3 in greater detail, each BasicEvent object characterizes a respective system event and, once the EventDirector object is notified of the generation of a system event by an event generator, the EventDirector object has two primary responsibilities. One such responsibility is creating a BasicEvent object to represent system event data and forward it on to all known event management subsystems (i.e., the EventManagementFramework objects). Another such responsibility is managing the lifetime of BasicEvent objects and the data store containing them. As discussed herein in greater detail, the EventDirector object understands the lifetime requirements of a BasicEvent object such that it understands when a BasicEvent object must be destroyed.

Event framework unification functionality in accordance with the present invention relies upon event framework unification rules that are applied to each event framework information object that represent a corresponding event framework in a system. For each one of the event framework information objects, event framework unification functionality is performed dependent upon respective ones of the event framework unification rules. It is disclosed herein that there are at least two types of event framework unification rules. There are rules that are non-specific to the event framework information objects (i.e., overarching rules applied to all event framework information object) and there are rules that are specific to select ones of the event framework information objects (i.e., framework-specific rules).

The rules that are non-specific to the respective one of the event framework information objects include, but are not limited to, a rule that management of system events through a particular protocol must not cause side effects from the protocol perspective (i.e., overarching Rule 1), a rule that an aggregate framework event representation must be deleted in a single action (i.e., overarching Rule 2) and a rule that removal of a reference to a particular one of the event information objects by one of the event frameworks (as a direct result of a delete event operation being proxied by the EventDirector) requires all other ones of the event frameworks to be notified of such removal (i.e., overarching Rule 3). The rule relating to management of system events through a particular protocol (i.e., protocol P) requires that the end result of a management action taken must not violate the rules of protocol P. An example of this rule is that the deletion of an Intelligent Platform Management Interface (IPMI) System Event Log (SEL) entry must not cause other IPMI SEL entries to be unexpectedly deleted. The rule relating to an aggregate framework event representation (i.e., in an aggregation-type framework) having to be deleted in a single action requires that any event framework protocol that composes multiple independent data store events (i.e., BasicEvent objects) as an aggregate must not allow a piece of the aggregate to be deleted unless the whole aggregation is deleted. An example of this is with an event history that is a composite of multiple events that have been generated against a single system component. Ultimately, it would be undesirable to have only a piece of the history deleted. The rule relating to removal of a reference to a particular one of the event information objects by one of the event frameworks requiring that all other ones of the event frameworks being notified of such removal requires that, when a deletion request comes in for a particular framework and if that framework removes a reference to a datastore object, all other frameworks must be notified of this reference removal so that they may take appropriate action (i.e. there may be a side effect of another event framework protocol removing its reference in response).

Framework-specific rules vary from framework-to-framework. Accordingly, the framework-specific rules for two different frameworks may be entirely different, partially different or identical. The exact make-up of the framework-specific rules for a particular framework will depend on the underlying functionality for that framework. As depicted in the following examples of real-world events that could be generated on a server system, the framework-specific rules and overarching rules jointly dictate the sequence of events that ensue from an action being applied to a framework in a system. In these examples, the overarching rules and framework-specific rules are followed in order to understand how a unified and consistent views in multiple system event frameworks is facilitated in accordance with the present invention.

EXAMPLE 1

One Sensor With One-To-One Sensor/Component Relationship

In a Newisys-brand server, two system event frameworks enable management of system events. The first system event framework is a proprietary system event framework referred to herein as the Newisys event framework (i.e., NWS event framework). The second framework is in accordance with the Intelligent Platform Management Interface standard (i.e., IPMI event framework). The NWS event framework is an aggregation-type event framework and the IPMI event framework is a singleton-type event framework. Respective collections of framework-specific rules apply to each one of these system event frameworks.

NWS Event Framework Unification Rules
  NWS Rule 1: A unique system event may be deleted at any time.
  NWS Rule 2: Non-unique (or aggregate) system events can be deleted when the composite severity of the non-unique system events is informational.
  NWS Rule 3: All instances of a system event representation by the first one of the event framework information objects will be deleted in response to the reference to the common one of the event information objects being removed unless such action would violate another one of the rules that are specific to the first one of the event frameworks.

IPMI Event Framework Unification Rules
  IPMI Rule 1: Any system event can be deleted at any time.
  IPMI Rule 2: Each system event representation by the second one of the event frameworks has a 1:1 relationship with a respective one of the event information objects.
  IPMI Rule 3: A system event representation by the second one of the event frameworks is deleted when the corresponding one of the event information objects is deleted.

Figure 4:
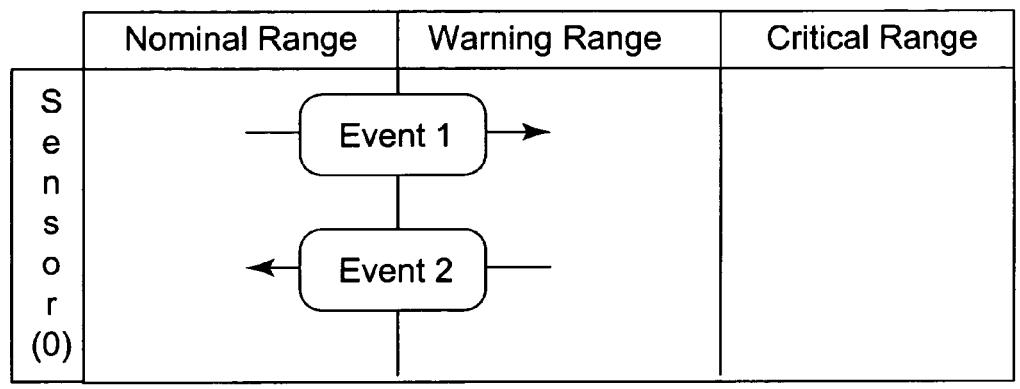
FIG. 4 is a system event diagram depicting various events within a system having a single system component sensor.

FIG. 4 shows a system event diagram for a single system component sensor (i.e., Sensor 0). Sensor 0 has a relationship with one system component (i.e., Component A), such as for example a system enclosure, a CPU, a circuit substrate, etc. Event 1 represents Sensor 0 output (e.g., temperature) moving from a nominal range across a warning threshold to a warning range and Event 2 represents Sensor 0 output moving from the warning range back to the nominal range.

Figure 5:
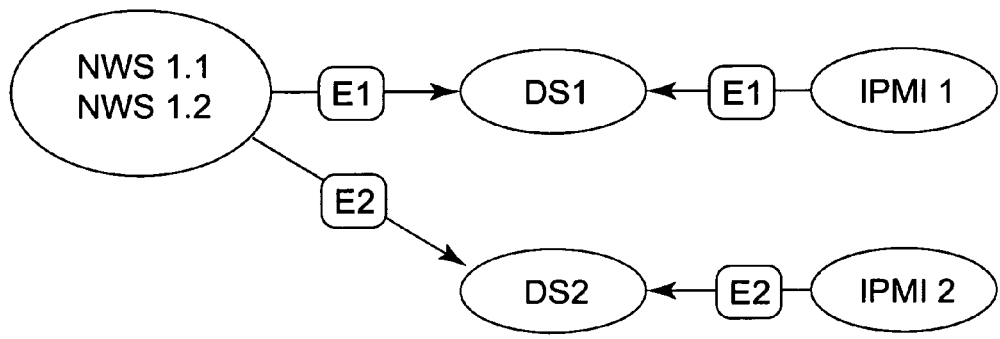
FIG. 5 is an object model representation of the events depicted in FIG. 4.

FIG. 5 shows an object model representation of the result of Event 1 and Event 2. DS1 represents a BasicEvent object that indicates Sensor 0 output has moved from the nominal range across the warning threshold to the warning range and DS2 represents a BasicEvent object that indicates Sensor 0 output has moved from the warning range across the warning threshold to the nominal range. Each arrowed line represents a reference between the BasicEvent object (e.g., DS1) and a particular EventManagementFramework object (e.g., IPMI 1), which was created in response to a corresponding Event (e.g., Event 1). Thus, DS1 and DS2 each have a reference count of two (2).

Still referring to FIG. 5, NWS 1.1 represents an EventManagementFramework object for the Newisys event framework, which indicates that Component A is in a warning state (i.e., sensor 0 output has moved from the nominal range across the warning threshold to the warning range). IPMI 1 represents an EventManagementFramework object for the IPMI event framework, which indicates that Component A is in the warning state. NWS 1.1 and IPMI 1 each reference DS1 as a result of Event 1 (E1). NWS 1.2 represents an EventManagementFramework object for the Newisys event framework, which indicates that sensor 0 output for Component A has moved from the warning range across the warning threshold to the nominal range (i.e., an informational state). IPMI 2 represents an EventManagementFramework object for the IPMI event framework, which indicates that sensor 0 output for Component A has moved from the warning range across the warning threshold to the nominal range. NWS 1.2 and IPMI 2 each reference DS2 as a result of Event 2 (E2).

Figure 6:
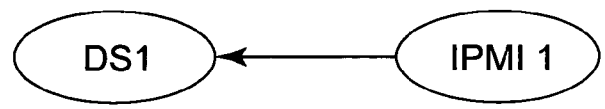
FIG. 6 is an object model representation of event framework unification functionality results associated with deletion of IPMI 2 as applied to the object model representation of events depicted in FIG. 5.

FIG. 6 shows the event framework unification functionality results associated with deletion of IPMI 2 through the IPMI event framework as applied to the object model representation of the combined result of Event 1 and Event 2 shown in FIG. 5. IPMI 2 is deleted in accordance with IPMI Rule 1 and the reference to DS2 by IPMI 2 is removed (i.e., the reference count of DS1 is decremented by 1). The NWS framework is thereafter notified of DS2 reference removal in accordance with Overarching Rule 3. The reference removal notification that the NWS framework receives is in essence a request for the NWS framework to delete NWS 1.2, which also references DS2. In accordance with NWS Rule 2 and NWS Rule 3 and no other rules being violated, NWS 1.2 and NWS 1.1 are deleted and the respective references to DS1 and DS2 by the NWS 1.1 and 1.2, respectively, are removed. Lastly, DS2 is deleted as a result of having no more references to it (i.e., a reference count of zero(0)). The end result is that DS1 remains with a single reference to it by IPMI 1.

Figure 7:
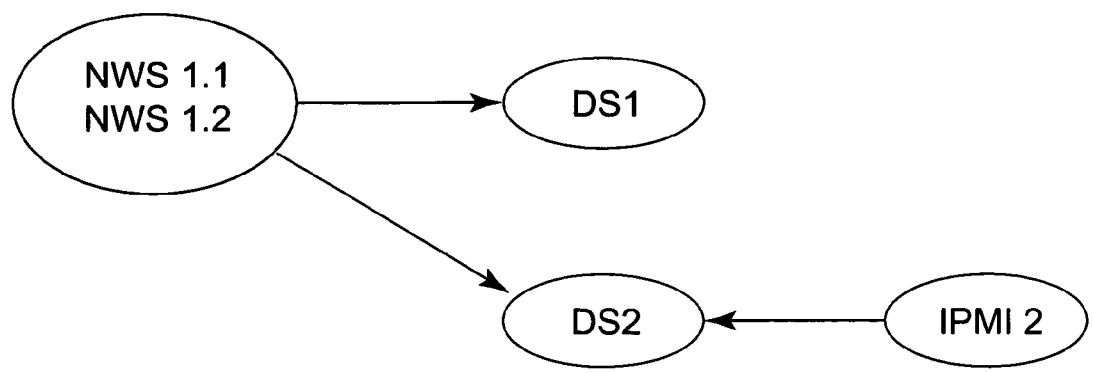
FIG. 7 is an object model representation of event framework unification functionality results associated with deletion of IPMI 1 as applied to the object model representation of events depicted in FIG. 5.

FIG. 7 shows the event framework unification functionality results associated with deletion of IPMI 1 through the IPMI event framework as applied to the object model representation of the combined result of Event 1 and Event 2 shown in FIG. 5. IPMI 1 is deleted in accordance with IPMI Rule 1 and the reference to DS1 by IPMI 1 is removed (i.e., the reference count of DS1 is decremented by 1). The NWS framework is thereafter notified of DS1 reference removal in accordance with Overarching Rule 3. No other rules apply to deleting events. The end result is that DS1 and DS2 remain, a single aggregate NWS event (NWS: 1.1 and NWS 1.2) remains with references to both DS1 and DS2, and a single IPMI event (IPMI 2) remains with a reference to DS2.

EXAMPLE 2

Multiple Sensors with Many-to-One Sensor/Component Relationship

The server assumptions and framework-specific rules disclosed above for Example 1 apply to Example 2.

Figure 8:
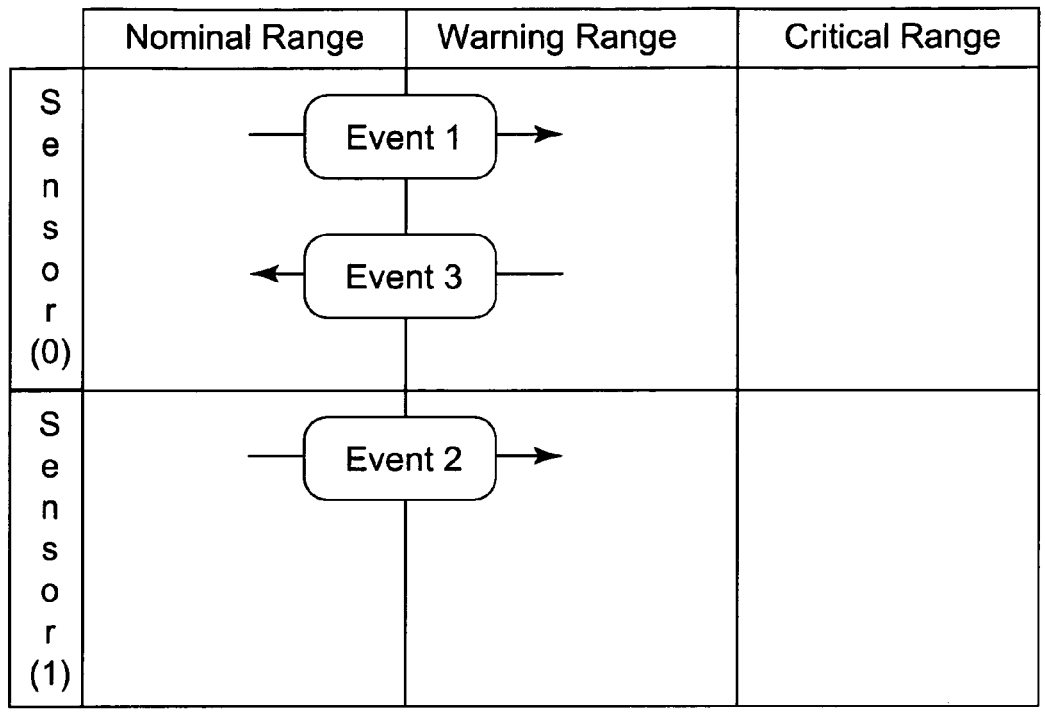
FIG. 8 is a system event diagram depicting various events within a system having multiple system component sensors.

FIG. 8 shows a system event diagram for a pair of system component sensors (i.e., Sensor 0 and Sensor 1). Sensor 0 and Sensor 1 have a one-to-many relationship with system components, one of them being the same. Sensor 0 has parent components of Component A (e.g., CPU A) and Component B (e.g., motherboard A) while Sensor 1 has parent components of Component B and Component C (e.g., CPU B). Event 1 represents Sensor 0 output moving from a respective nominal range across a respective warning threshold to a respective warning range, Event 2 represents Sensor 1 output moving from a respective nominal range across a respective warning threshold to a respective warning range and Event 3 represents Sensor 0 output moving from the respective warning range back to the respective nominal range.

Figure 9:
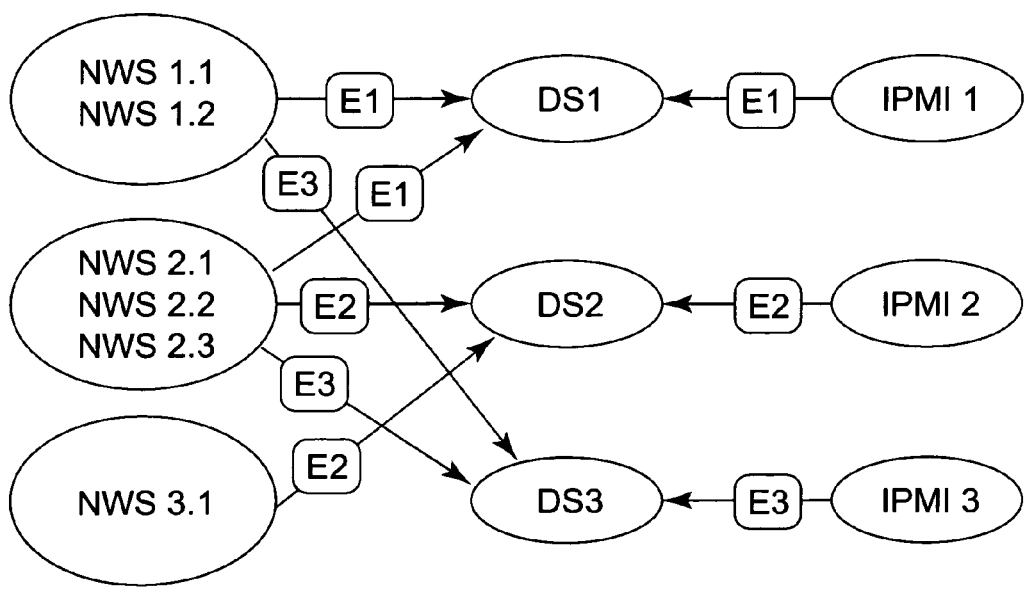
FIG. 9 is an object model representation of the events depicted in FIG. 8.

FIG. 9 shows an object model representation of the result of Event 1, Event 2 and Event 3. DS1 represents a BasicEvent object that indicates Sensor 0 output has moved from the respective nominal range across the respective warning threshold to the respective warning range, DS2 represents a BasicEvent object that indicates Sensor 1 output has moved from the respective nominal range across the respective warning threshold to the respective warning range and DS3 represents a BasicEvent object that indicates Sensor 0 output has moved from the respective warning range across the respective warning threshold to the respective nominal range. Each arrowed line represents a reference between the BasicEvent object (e.g., DS1) and a particular EventManagementFramework object (e.g., IPMI 1), which was created in response to a corresponding Event (e.g., Event 1). Thus, DS1, DS2 and DS3 each have a reference count of two (2).

Still referring to FIG. 9, NWS 1.1 represents an EventManagementFramework object for the Newisys event framework, which indicates that Component A is in a respective warning state (i.e., sensor 0 output has moved from the respective nominal range across the respective warning threshold to the respective warning range). NWS 2.1 represents an EventManagementFramework object for the Newisys event framework, which indicates that Component B is in the respective warning state. IPMI 1 represents an EventManagementFramework object for the IPMI event framework, which indicates that Component A is in the warning state. NWS 1.1, NWS 2.1 and IPMI 1 each reference DS1 as a result of Event 1 (E1). NWS 2.2 represents an EventManagementFramework object for the Newisys event framework that references DS2. NWS 3.1 represents an EventManagementFramework object for the Newisys event framework, which indicates that Component C is in a respective warning state (i.e., sensor 1 output for Component C has moved from the respective nominal range across the respective warning threshold to the respective warning range). IPMI 2 represents an EventManagementFramework object for the IPMI event framework, which indicates that sensor 1 output for Component C is in the respective warning range. NWS 2.2, NWS 3.1 and IPMI 2 each reference DS2 as a result of Event 2 (E2). NWS 1.2 represents an EventManagementFramework object for the Newisys event framework that references DS3, which indicates that Component A is in a respective informational (or nominal) state. NWS 2.3 represents an EventManagementFramework object for the Newisys event framework that references DS3. IPMI 3 represents an EventManagementFramework object for the IPMI event framework, which indicates that sensor 1 output for Component A is in the respective nominal range. NWS 1.2, NWS 1.3 and IPMI 3 each reference DS3 as a result of Event 3 (E3).

Figure 10:
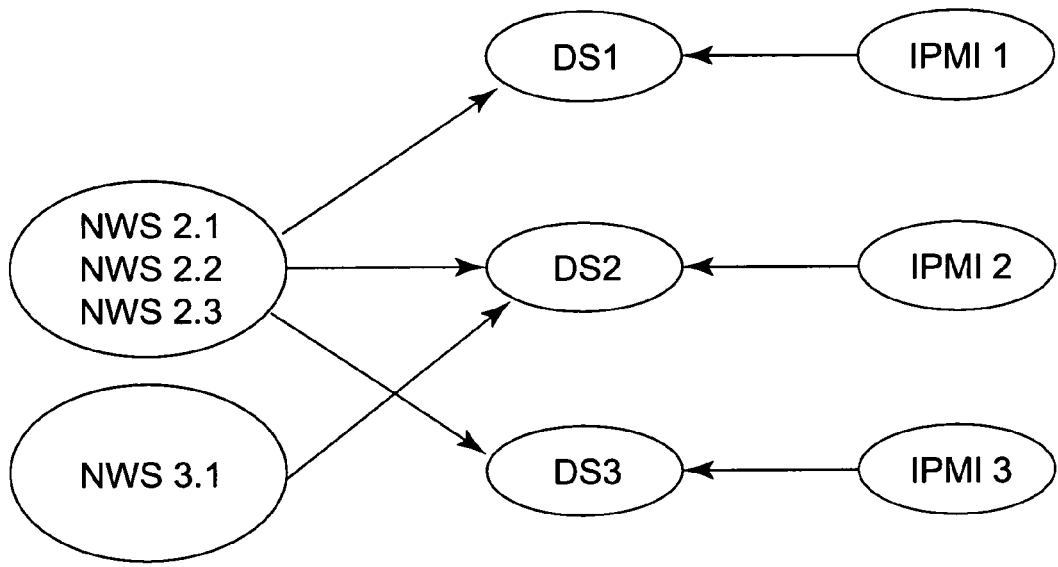
FIG. 10 is an object model representation of event framework unification functionality results associated with deletion of NWS 1.1 as applied to the object model representation of events depicted in FIG. 9.

FIG. 10 shows the event framework unification functionality results associated with deletion of NWS composite event 1 (containing both NWS 1.1 and NWS 1.2) through the NWS framework as applied to the object model representation of the combined result of Event 1, Event 2 and Event 3 shown in FIG. 9. NWS 1.1 is deleted in accordance with NWS Rule 2 and the references to DS1 and DS3 by NWS 1.1 and NWS 1.2, respectively, are removed (i.e., the reference count of DS1 and DS3 are each decremented by 1). The IPMI framework is thereafter notified of DS1 and DS 3 reference removals in accordance with Overarching Rule 3. No other rules apply to deleting events. The IPMI events are not deleted because there is still another event management framework object (i.e., that corresponding to the IPMI event framework) referring to DS events.

Figure 11:
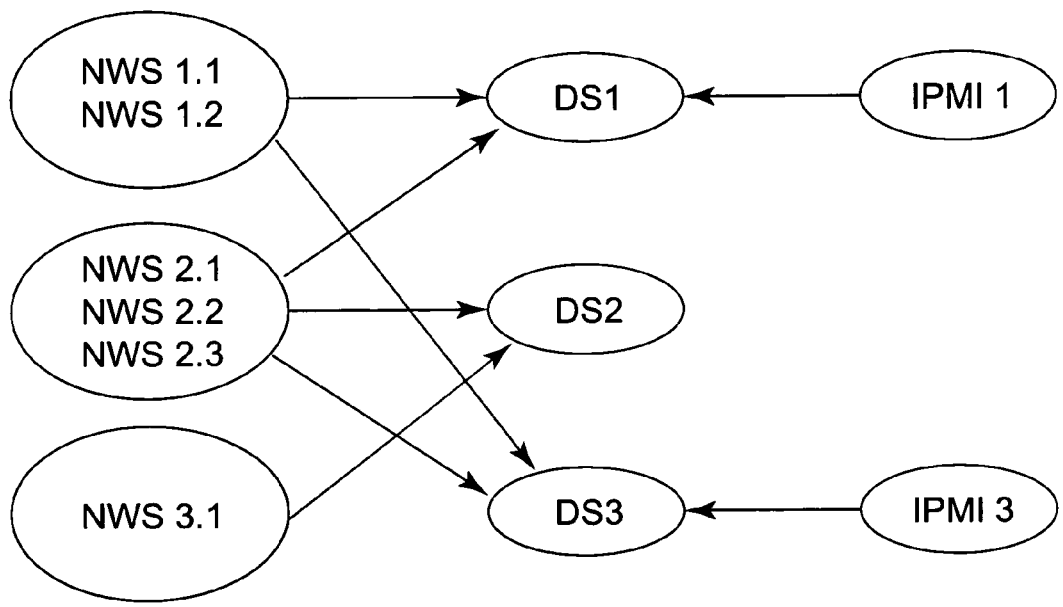
FIG. 11 is an object model representation of event framework unification functionality results associated with deletion of IPMI 2 as applied to the object model representation of events depicted in FIG. 9.

FIG. 11 shows the event framework unification functionality results associated with deletion of IPMI 2 through the IPMI framework as applied to the object model representation of the combined result of Event 1, Event 2 and Event 3 shown in FIG. 9. IPMI 2 is deleted in accordance with IPMI Rule 1 and the reference to DS2 by IPMI 2 is removed (i.e., the reference count of DS2 is decremented by 1). The framework is thereafter notified of the DS2 reference removal in accordance with Overarching Rule 3. No other rules apply to deleting events. The IPMI events are not deleted because there is still another event management framework object (i.e., that corresponding to the IPMI event framework) referring to DS events.

Figure 12:
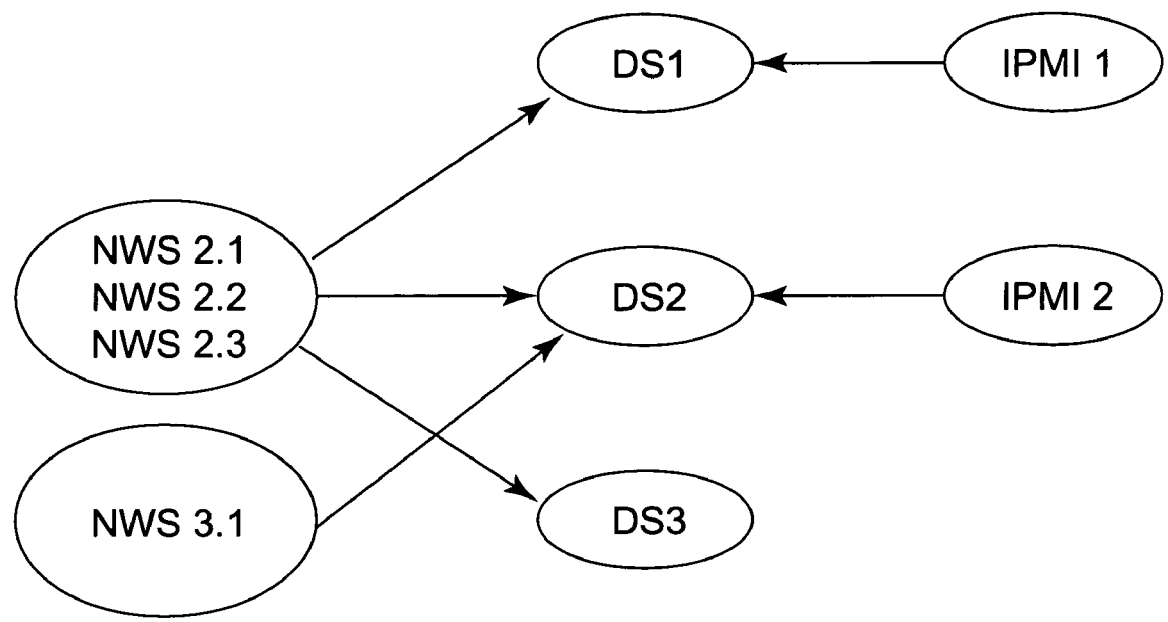
FIG. 12 is an object model representation of event framework unification functionality results associated with deletion of IPMI 3as applied to the object model representation of events depicted in FIG. 9.

FIG. 12 shows the event framework unification functionality results associated with deletion of IPMI 3 through the IPMI event framework as applied to the object model representation of the combined result of Event 1, Event 2 and Event 3 shown in FIG. 9. IPMI 3 is deleted in accordance with IPMI Rule 1 and the reference to DS3 by IPMI 3 is removed (i.e., the reference count of DS3 is decremented by 1). The NWS framework is thereafter notified of DS2 reference removal in accordance with Overarching Rule 3. The reference removal notification that the NWS framework receives is in essence a request for the NWS framework to delete NWS 1.2, which also references DS3. In accordance with NWS Rule 2 and NWS Rule 3 and no other rules being violated, NWS 1.2 and NWS 1.1 are deleted and the respective references to DS1 and DS3 by the NWS 1.1 and 1.2, respectively, are removed. NWS 2.3 does not delete DS3 in view of its remaining reference.

Referring now to computer readable medium, it will be understood from the inventive disclosures made herein that methods, processes and/or operations adapted for enabling event framework unification functionality in accordance with the present invention are tangibly embodied by computer readable medium having instructions thereon for carrying out such functionality. In one specific embodiment, the instructions are tangibly embodied for carrying out the functionality depicted in Examples 1 and 2 as well as the methodology depicted in method 200 for enabling unification of event framework views in accordance with the present invention. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out functionality of a shared event data store platform in accordance with the present invention and event framework unification functionality.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An object model, comprising:
   a data store including a plurality of event information objects each defining server event information for a respective one of a plurality of unique events exhibited by a server during operation; and
   a plurality of event framework information objects each defining event framework characteristics for a respective one of a plurality of event frameworks implemented in the server, wherein at least one of said event framework information objects reference a common one of said event information objects for enabling server event information defined by the common one of said event information objects to be viewed using the respective one of said event frameworks corresponding thereto and wherein each one of said event framework information objects define event framework unification rules under which unification of event framework views provided in accordance with each one of said event framework information objects is facilitated.

2. The object model of claim 1 wherein said event framework unification rules of a respective one of said event framework information objects include:

rules that are non-specific to the respective one of said event framework information objects; and rules that are specific to the respective one of said event framework information objects.

3. The object model of claim 2 wherein:

said rules that are non-specific to the respective one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal.

4. The object model of claim 3 wherein:

said rules that are specific to a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said rules that are specific to the second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

5. The object model of claim 1 wherein:

said event framework unification rules defined by a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks;

said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

6. The object model of claim 1 wherein said unification of event framework views provided in accordance with each one of said event framework information objects includes deleting system event representations of each one of event frameworks for the common one of said event information objects in accordance with said event framework unification rules.

7. The object model of claim 6 wherein:

said event framework unification rules defined by each one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal;

said event framework unification rules defined by a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

8. A method of facilitating unification of event framework views, comprising:

creating an event information object defining server event information for a respective one of a plurality of unique events exhibited by the server during operation;

creating a reference to the event information object by each one of a plurality of event framework information objects, wherein each one of said event framework information objects define respective event framework unification rules under which unification of event framework views provided in accordance with each one of said event framework information objects is facilitated;

implementing an action affecting a first one of said event framework information objects dependent upon event framework unification rules defined by the first one of said event framework information objects;

notifying a second one of said event framework information objects of the action affecting the first one of said event framework information objects; and assessing event framework unification rules defined by the second one of said event framework information objects for determining an action to be taken with respect to the second one of said event framework information objects.

9. The method of claim 8, further comprising:

implementing the action affecting the second one of said event framework information objects after performing said determining the action to be taken with respect to the second one of said event framework information objects and confirming that the action to be taken with respect to the second one of said event framework information objects does not violate any of said event framework unification rules defined by the second one of said event framework information objects.

10. The method of claim 9, further comprising:

deleting the event information object after performing said assessing event framework unification rules defined by the second one of said event framework information objects;

wherein the action affecting the first one of said event framework information objects includes deleting the reference of the first one of said event framework information objects to the event information object; and wherein the action affecting the second one of said event framework information objects includes deleting the reference of the second one of said event framework information objects to the event information object.

11. The method of claim 10 wherein:

said respective event framework unification rules defined by each one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal;

said rules that are specific to a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

12. The method of claim 8 wherein:

said respective event framework unification rules defined by each one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal;

said rules that are specific to a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

13. The method of claim 8 wherein said event framework unification rules defined by a respective one of said event framework information objects includes:

rules that are non-specific to the respective one of said event framework information objects; and rules that are specific to the respective one of said event framework information objects.

14. A server, comprising:

at least one data processing device;

memory coupled to said at least one data processing device; and instructions accessible from said memory and processable by said at least one data processing device, wherein said instructions are configured for enabling said at least one data processing device to facilitate:

creating an event information object defining server event information for a respective one of a plurality of unique events exhibited by the server during operation;

creating a reference to the event information object by each one of a plurality of event framework information objects, wherein each one of said event framework information objects define respective event framework unification rules under which unification of event framework views provided in accordance with each one of said event framework information objects is facilitated;

implementing an action affecting a first one of said event framework information objects dependent upon event framework unification rules defined by the first one of said event framework information objects;

notifying a second one of said event framework information objects of the action affecting the first one of said event framework information objects; and assessing event framework unification rules defined by the second one of said event framework information objects for determining an action to be taken with respect to the second one of said event framework information objects.

15. The server of claim 14 wherein said instructions are configured for enabling said at least one data processing device to facilitate implementing the action affecting the second one of said event framework information objects after performing said determining the action to be taken with respect to the second one of said event framework information objects and confirming that the action to be taken with respect to the second one of said event framework information objects does not violate any of said event framework unification rules defined by the second one of said event framework information objects.

16. The server of claim 15 wherein:

said instructions are configured for enabling said at least one data processing device to facilitate deleting the event information object after performing said assessing event framework unification rules defined by the second one of said event framework information objects;

the action affecting the first one of said event framework information objects includes deleting the reference of the first one of said event framework information objects to the event information object; and the action affecting the second one of said event framework information objects includes deleting the reference of the second one of said event framework information objects to the event information object.

17. The server of claim 16 wherein:

said respective event framework unification rules defined by each one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal;

said rules that are specific to a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

18. The server of claim 14 wherein:

said respective event framework unification rules defined by each one of said event framework information objects include a rule that management through a particular protocol must not cause side effects from said protocol perspective, a rule that an aggregate framework event representation must be deleted in a single action and a rule that removal of a reference to a particular one of said event information objects by one of said event frameworks requires all other ones of said event frameworks to be notified of such removal;

said rules that are specific to a first one of said event framework information objects, which represents an aggregation-type event framework, include a rule that a unique system event may be deleted at any time, a rule that non-unique system events can be deleted when the composite severity of said non-unique system events is informational and a rule that all instances of a system event representation by the first one of said event framework information objects will be deleted in response to the reference to the common one of said event information objects being removed unless such action would violate another one of said rules that are specific to the first one of said event frameworks; and said event framework unification rules defined by a second one of said event framework information objects, which represents a singleton-type event framework, include a rule that any system event can be deleted at any time, a rule that each system event representation by the second one of said event frameworks has a 1:1 relationship with a respective one of said event information objects and a rule that a system event representation by the second one of said event frameworks is deleted when the corresponding one of the event information objects is deleted.

19. The server of claim 14 wherein said event framework unification rules defined by a respective one of said event framework information objects includes rules that are non-specific to the respective one of said event framework information objects and rules that are specific to the respective one of said event framework information objects.

* * * * *